Patented Apr. 25, 1950

2,505,740

UNITED STATES PATENT OFFICE 2,505,740

SCREEN OIL

William C. Morris, Mayfield Heights, and Samuel Z. Cardon, Cleveland, Ohio, assignors to The Harshaw Chemical Company, Elyria, Ohio, a corporation of Ohio No Drawing. Application June 24, 1947, Serial No. 756,810

10 Claims. (Cl. 260—27)

This invention relates to screen oils or squeegee oils which are suspending agents for suspending pigmented ceramic fluxes for application to ceramic ware by a process known as the "screen process" or as the "squeegee process."

While the screen process in its variant forms is well known in the ceramic art, it may be said that it comprises essentially forcing a suspended vitrifiable material of the glaze or enamel type through the meshes of a screen composed of silk, metal or other material into contact with the ceramic ware to be decorated. It will be understood that the design is produced by masking such portions of the screen as overlie the surface areas of the ware not to be covered by the suspended vitrifiable material. This may be accomplished by means of a stencil or otherwise.

The materials to be suspended in screen oil are various but may be such as for example are described in U. S. patent to C. J. Harbert and W. C. Morris No. 2,390,366 issued Dec. 4, 1945, it being understood that the glaze may be pigmented by any of various color compositions known to the ceramic art including white and black compositions.

In order to be satisfactory, a screen oil must be of a consistency suitable for application by the screen process, must have enough body to avoid "running" after application to the ceramic ware and must volatilize almost completely during firing of the decorated ware so as to leave little or no carbon in the decoration. Obviously the time consumed in bringing up to maximum temperature during firing will affect the degree of volatilization of the screen oil, yet practically speaking, this time cannot be prolonged too much without unduly increasing the cost of the process.

We have now discovered that a screen oil of superior properties, meeting very satisfactorily the above indicated and other requirements can be produced by dissolving various components in a terpene solvent or a mixed solvent comprising mainly a terpene solvent such as pine oil and a minor amount of a hydrocarbon solvent, the components added to the solvent including as a bodying agent a polybutene (polymerized butene) of molecular weight from 40,000 to 120,000 and preferably also including a soft resin or plasticizer and a hard resin. It is also highly desirable to have present a small quantity of a wetting agent such as lecithin.

The soft resin or plasticizer may be such a substance as methyl abietate (Abalyn) or methyl dihydroabietate (Hercolyn) or other methyl, ethyl or glycerol esters of rosin acids or hydrogenated rosin acids (or other soft resins such as resins of the balsam type, e. g. copaiba balsam) which are soft solids or viscous liquids at room temperature (70° F.).

The hard resin may be a polymerized terpene resin or an alkyd resin containing a terpene acid radical in the molecule, such hard resins having melting points from 70° C. to 185° C. (e. g. Neolyn 20, an alkyd resin containing a terpene radical of melting point 72–78° C., acid No. 10–15, thiocyanate value 10; polymerized beta-pinene of melting point 75° C. to 150° C. preferably about 100° C. to 125° C. such as Piccolyte Rosin R 115; or glycerol esters of rosin or hydrogenated rosin acids of melting points from 75 to 185 such as Staybelite Ester a hydrogenated rosin glyceride melting at about 163° C. to 173° C. having an acid value of about 168, thiocyanate value 33 and ash content 0.01%.

The solvent may be principally a terpene solvent such as pine oil, dipentene, and Terposol #8, which are usual solvents for screen oils. We are able to use substantial proportions of hydrocarbon solvents such as mineral spirits, xylene or toluene in place of part of the terpene solvent. This is an unexpected advantage of the use of polybutent as the bodying agent in our screen oil formulation. Pine oil or other terpene solvent should still be the principal solvent, but the hydrocarbon solvent may replace a portion of the terpene solvent from 1% up to 20% by weight.

The absolute essentials for the realization of our invention are the terpene solvent and a small proportion of poly-butene. Desirably it also contains the hard and soft resins as indicated above and a wetting agent such as lecithin.

Suitable proportions are as follows:

|  | Preferred | Optimum |
|---|---|---|
| Solvent | 50–99 | 70–95 parts by weight. |
| Polybutene | 0.25–20 | 1–6 parts by weight. |
| Hard resin | 1–45 | 5–15 parts by weight. |
| Soft resin | 0.5–20 | 3–7 parts by weight. |
| Wetting agent | 0.1–5 | 0.25–0.75 parts by weight. |

The solvent contains a terpene solvent such as pine oil, dipentene, turpentine, Terposol No. 8 and the like and optionally may contain up to 20 per cent by weight of a hydrocarbon solvent such as mineral spirits, xylene, toluene and the like. The polybutene should be of molecular weight from 40,000 to 120,000 and while a pure polybutene is desirable, in practice a product of technical quality is satisfactory. A commercial product known as Vistanex is suitable for our purposes. The hard resin may be omitted but it is desirable to use a quantity as indicated above of one of the hard resins named or such quantity of a mixture thereof. The soft resin likewise may be omitted but it is highly desirable. The quantities indicated may be made up of one or a mixture of two or more of the resins indicated foregoing. The wetting agent may be omitted but it is very desirable to use the indicated quantities of lecithin or equivalent.

We have found that the indicated compositions meet the very exacting requirements for suspending glass enamels for application to ceramic ware by the screen or squeegee process, that they have suitable viscosity characteristics and volatilize away almost completely before the melting point of the suspended glaze (500° C.–600° C.) is reached.

Specific examples of screen oils according to the invention are shown in the following table wherein the numerical values indicate parts by weight.

|  | 1 | 2 | 3 | 4 | 5 | 6 |
|---|---|---|---|---|---|---|
| Polybutene [1] M. W. 40,000 |  | 3 |  |  | 1 | 5 |
| Polybutene [2] M. W. 80,000 | 4 |  | 2 |  |  |  |
| Polybutene [3] M. W. 120,000 |  |  |  | 3 | 1½ |  |
| Pine Oil | 96 | 74.75 | 70.5 | 73.9 | 82.1 | 54.5 |
| Xylene |  |  |  | 3 |  | 7 |
| Mineral Spirits (Varnolene) |  |  | 10 |  |  | 8 |
| DiPentene |  | 2 |  | 5 |  | 2 |
| Terpene solvent No. 8 [2] |  | 3 |  |  |  |  |
| Methyl abietate |  |  | 3 |  |  |  |
| Methyl dihydroabietate |  | 7 | 2 | 5 | 7 | 8 |
| Alkyd resin No. 20 [3] |  | 10 |  |  |  |  |
| Polymerized beta-pinene M. P. 115 |  |  |  | 5 |  | 5 |
| Alkyd Resin No. SS [4] |  |  |  |  | 8 | 8 |
| Hydrogenated Rosin glyceride |  |  | 12 | 5 |  | 3 |
| Lecithin |  | 0.25 | 0.5 | 0.10 | 0.4 | 0.5 |

[1] The polybutene has different body or viscosity depending upon the degree of polymerization. This is conveniently indicated by the average molecular weight. The molecular weight range of 40,000 to 120,000 is a suitable range of variation for this ingredient of our improved screen oil.

[2] This solvent is prepared according to Patent No. 2,136,011 by reacting a polyhydric alcohol with an unsaturated terpene. It is a commercial material sold as Terpesol No. 8.

[3] An alkyd resin (Neolyn 20) derived from glycerol and a terpenic acid and having a melting point from 72–78° C. and an acid value of 10 to 15.

[4] An alkyd resin (Petrex SS) derived from glycerol and a terpenic acid and having a melting point from 118° C. to 122° C. and an acid value of 135.

Having thus described our invention, what we claim is:

1. A screen oil composition essentially consisting of a solvent and at least 2% by weight of a polybutene of molecular weight from 40,000 to 120,000, the solvent constituting at least about 71.4% but not more than 96% of the composition by weight and a proportion of the solvent amounting to at least about 56% of the said composition by weight being a terpene solvent, said composition also containing as a plasticizer a resin of consistency at room temperature from that of a soft solid to that of a viscous liquid and selected from the group consisting of the methyl, ethyl and glycerol esters of rosin acid and hydrogenated rosin acid, and copaiba balsam.

2. A screen oil as defined in claim 1, the same also containing lecithin.

3. A screen oil composition essentially consisting of a solvent and at least 2% by weight of a polybutene of molecular weight from 40,000 to 120,000 and said composition also containing a resin of melting point from 70° C. to 185° C. selected from the group consisting of polymerized terpenes and glycerol esters of terpene acids, the solvent constituting at least about 71.4% but not more than 96% of the composition by weight and a proportion of the solvent amounting to at least about 56% of the said composition by weight being a terpene solvent.

4. A screen oil composition as defined in claim 3, the same also containing lecithin.

5. A screen oil composition essentially consisting of a solvent and at least 2% by weight of a polybutene of molecular weight from 40,000 to 120,000, the said composition also containing as a plasticizer a resin of consistency at room temperature from that of a soft solid to that of a viscous liquid and selected from the group consisting of the methyl, ethyl and glycerol esters of rosin acid and hydrogenated rosin acid, and copaiba balsam; and a resin of melting point from 70° C. to 185° C. selected from the group consisting of polymerized terpenes and glycerol esters of terpene acids, the solvent constituting at least about 71.4% but not more than 96% of the composition by weight and a proportion of the solvent amounting to at least about 56% of the said composition by weight being a terpene solvent.

6. A screen oil as defined in claim 5; the same also containing lecithin.

7. A screen oil composition containing 50 to 99 parts by weight of a terpene solvent; from 0.25 to 20 parts by weight of a polybutene of molecular weight from 40,000 to 120,000; from 0.5 to 20 parts by weight of a plasticizer of consistency from that of a soft solid to that of a viscous liquid at 70° F. the same being from the class consisting of the methyl, ethyl and glycerol esters of rosin acid and hydrogenated rosin acid, and copaiba balsam; from 1 to 45 parts by weight of a resin of melting point from 70° C. to 185° C. and selected from the group consisting of polymerized terpenes and glycerol esters of terpene acids; and from 0.1 to 1.0 part by weight of lecithin.

8. The screen oil as claimed in claim 7, wherein a portion of the solvent from 1% up to 20% by weight is replaced by an equal weight of hydrocarbon solvent.

9. A screen oil composition containing from 70 to 95 parts by weight of a terpene solvent; from 1 to 6 parts by weight of a polybutene of molecular weight from 40,000 to 120,000; from 3 to 7 parts by weight of a plasticizer of consistency from that of a soft solid to that of a viscous liquid at 70° F. the same being from the class consisting of the methyl, ethyl and glycerol esters of rosin acid and hydrogenated rosin acid, and copaiba balsam; from 5 to 15 parts by weight of a resin of melting point from 70° C. to 185° C. and selected from the group consisting of polymerized terpenes and glycerol esters of terpene acids; and from 0.1 to 1.0 parts by weight of lecithin.

10. The screen oil as claimed in claim 9 wherein a portion of the solvent from 1% up to 20% by weight is replaced by an equal weight of hydrocarbon solvent.

WILLIAM C. MORRIS.
SAMUEL Z. CARDON.

REFERENCES CITED

The following references are of record in the file of this patent:

UNITED STATES PATENTS

| Number | Name | Date |
|---|---|---|
| 2,349,508 | Mack | May 23, 1944 |
| 2,379,507 | Dyrup | July 3, 1945 |

OTHER REFERENCES

Chem. Ind., June 1937, XV, page 609.
Official Digest, Nov. 1944, pages 511–513.